April 25, 1961 J. J. CUVELIER 2,981,794

TELEPRINTER SECRECY SYSTEM

Filed Feb. 6, 1959 3 Sheets-Sheet 1

April 25, 1961 J. J. CUVELIER 2,981,794

TELEPRINTER SECRECY SYSTEM

Filed Feb. 6, 1959 3 Sheets-Sheet 3

2,981,794

TELEPRINTER SECRECY SYSTEM

Jean Jacques Cuvelier, Rue Defuisseaux, Marcinelle, Belgium, assignor to Ateliers de Constructions Electriques de Charleroi, Brussels, Belgium, a corporation of Belgium Filed Feb. 6, 1959, Ser. No. 791,630
Claims priority, application Belgium Feb. 14, 1958
3 Claims. (Cl. 178—22)

This invention relates generally to cryptography and more particularly to an apparatus usable with teleprinters for encoding and decoding messages.

It is well known to transmit messages to a distant point by means of teleprinters, which supply at the receiving end a printed copy of each message transmitted. Such transmissions can be effected by wire or by radio link between the transmitting and receiving ends. Whatever means for transmission is utilized, a code is adopted which allocates one or more selected pulses to each letter, sign or character to be transmitted and at the receiving end the pulses are converted, by means of punching or printing mechanisms, into the letters, signs or characters which they represent as a function of the code adopted.

A principal object of the invention is to provide a simple but effective apparatus or system using a two-code system for keeping teleprinter communications secret even if intercepted.

Another object of the invention is to provide a teleprinter system with a ciphering and deciphering device using strips arbitrarily perforated according to chance by virtue of which messages sent in the clear are transmitted directly in cipher and are printed directly in the clear at the receiving end with provision being made for the messages transmitted to be checked locally in the clear.

A feature, according to the invention, is that the encoding and decoding functions take place in the system under control of two like perforated strips. Each strip has perforations arranged in five tracks which correspond to a five unit international code. Each track has perforations corresponding to the units of the code and the perforations are arranged according to an aleatory law, that is, arbitrarily arranged according to chance.

The message transmitting end of the system is provided with a teleprinter keyboard and associated equipment for generating signals representative of characters of a text of a message in the clear. Encoding means are provided comprising sensing elements for sensing one of the perforated strips and operatively controlling the energization of the relays of a relay matrix for transmitting signals or pulses in a twelve unit code with the signals thereof arranged in an arbitrary arrangement, and each signal corresponding to an inversion of the signals or pulses representative of an international code whereby the characters represented by the signals are arbitrarily arranged and the text of a message transmitted is ciphered or encoded.

At the receiving end, the system is provided with a conversion device for converting the twelve unit code to the international code and a decoding device which has sensing elements sensing the other perforated strip for effectively controlling the energization of relays of a second relay matrix to convert the inverted signals of the international code back to the signals normally representative of the international code whereby the signals, once converted, are representative of the international code characters in clear text.

Other features and advantages of the device in accordance with the present invention will be better understood as described in the following specification and appended claims in conjunction with the following drawings in which—

Figure 1:
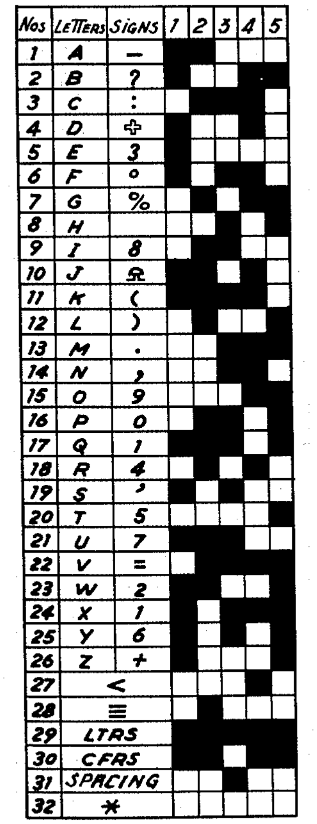
Fig. 1 is a diagram of a code representative of a five unit international code employed by the system according to the invention.

Currently, in teleprinter sytems an international code known as a "five unit" code (Fig. 1) is generally employed for wire or cable transmission. The transmitting end of the teleprinter system generates signals representative of characters to be transmitted. In a diagram illustrative of such a code, the dark areas indicate, say, voltage (or current) "on" and the white areas, voltage (or current) "off." Generally, the dark and white areas are termed respectively "markings" and "spacings." Thus, for example, according to Fig. 1, in the transmission of the letter A, the markings 1 and 2 indicate current "on" conditions whereas during spacings 3, 4 and 5 on the horizontal line representative of the characters 1, A and the "minus mark" indicate current "off" conditions. It being understood that each vertical column is a code unit so there are five units 1 through 5 as indicated. For ease of explanation the term "unit" will include either a "marking" or a "spacing" as set forth herein.

In known systems, the electric signals or current pulses energize relays which cooperate with appropriate mechanism to print the letters, signs or characters corresponding to the different signal combinations. Such systems have a serious limitation in that if a radio link is employed between the transmitting and receiving ends, noise can have substantially the effect of a current pulse emitted by the transmitting end so that a relay at the receiving end will sometimes be energized when it should not be which may render the message unintelligible and garbled.

Various other systems have been proposed, one of which is usable with the present invention as later herein set forth. In such systems, a code of two successive signals at an audio-frequency is employed to correspond to each letter, sign or character to be transmitted. These two signals have different frequencies and the system may employ, for example, twelve frequencies in number ranging, for example, from 406 to 586 cycles per second. The signals may be arranged in two groups (Fig. 2) in which a group I comprises eight separate frequencies and group II comprises four separate frequencies as numbered. In such a system, it can be seen that the letter A, for example, corresponds to the emission of a signal at the eighth frequency belonging to group I followed by a signal at the ninth frequency belonging to group II.

At the receiving end of such systems after detection, and amplification, the signals received act upon twelve frequency responsive elements such as vibratory elements which may be vibrating blades which are energized by an electromagnetic system in the manner described in the Coquelet co-pending application, Serial No. 485,490 filed February 1, 1955, now U.S. Patent No. 2,771,506. Each of the blades has an inherent or resonant frequency equal to one of the twelve emitted frequencies thus each blade can vibrate only if the relay controlling its actuation is subjected to a current "on" condition at a frequency equal to the resonant frequency of the blade itself. The blades in such systems are associated with contacts which are connected in a certain order to the grids of five discharge tubes, each having an anode circuit which passes through one of the relays. The order of the connections is arranged in such a way that direct correspondence is established between the twelve frequency code and the five unit code represented by the international code. Five electromagnets energized by the five discharge tubes actuate selection mechanisms similar to those utilized in apparatus operating according to the international code.

In order to establish correspondence between the twelve frequency code and the five unit code, the latter code has been distributed in two groups, according to the invention, in which the first group comprises units 3, 4 and 5 and the second group comprises the units 1 and 2. According to Fig. 3, a diagram illustrative of the correspondence between the twelve frequency code and the five unit code, it can be seen, for example, that when a signal having the frequency numbered 8 is received there is an "off" current condition so that no relays corresponding to units 3, 4 and 5 of the first group are energized nor are relays corresponding to units 1 and 2 energized since the latter belong to the second group of the correspondence diagram. If, however, a signal corresponding to frequency No. 9 is received electromagnets or relays corresponding to units 1 and 2 would be energized in such an apparatus so that in this case the transmission would correspond to the transmission of the letter A according to the twelve frequency code or the five unit code. As will be seen hereinafter, the present invention makes use of these principles in carrying out encoding and decoding functions.

The present invention is herein described as applied to a teleprinter system using a radio link between the transmitting and receiving ends thereof. It will be understood that the invention is equally applicable to teleprinter systems using wire as the link.

Referring to the drawings, a system, according to the invention, comprises (Fig. 4) a keyboard and associated equipment shown schematically in block K. The teleprinter arrangement K generates signals, in known manner, at different frequencies corresponding to the frequencies numbered 1 through 12 in Fig. 2 and are transmitted through twelve separate paths, 1 through 12, through the contacts of relays 13 through 17.

In the "off" condition of relays 13 through 17 the signals are transmitted through twelve paths or lines numbered 1 through 12 operatively connected to lines 1' through 12' to corresponding amplifiers A1 through A12 which are operatively connected to a modulator M and radio transmitter T for transmission, in known manner, of a modulated carrier wave with the signals or characters which they represent in the text of a message by radio link to a receiving station or receiving end of the system.

At the receiving end (Fig. 5), a radio receiver R receives the signals, detects, and amplifies them with an audioamplifier $A_m$ and the signals or pulses are applied to selectors $S_1$ and $S_2$ which have frequency responsive elements or vibrating blades (not shown) which function as herein described.

Figure 2:
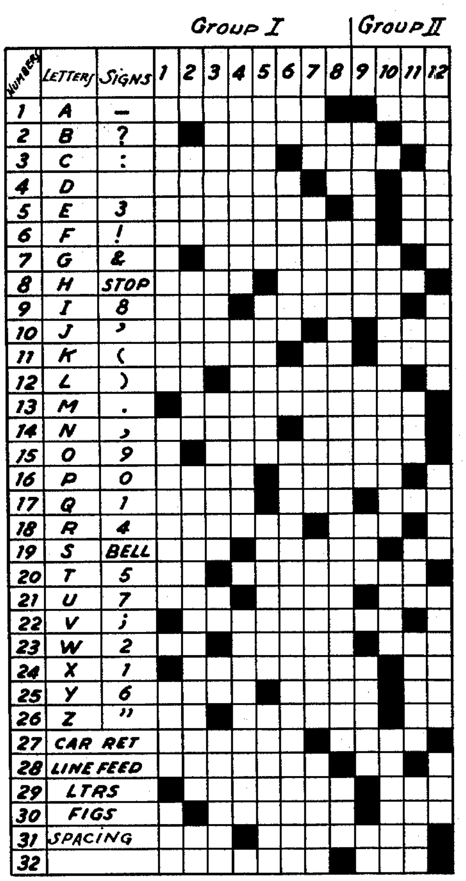
Fig. 2 is a diagram representative of a twelve unit code whose units or "markings" and "spacings" are divided into two groups according to the invention.
Figure 5:
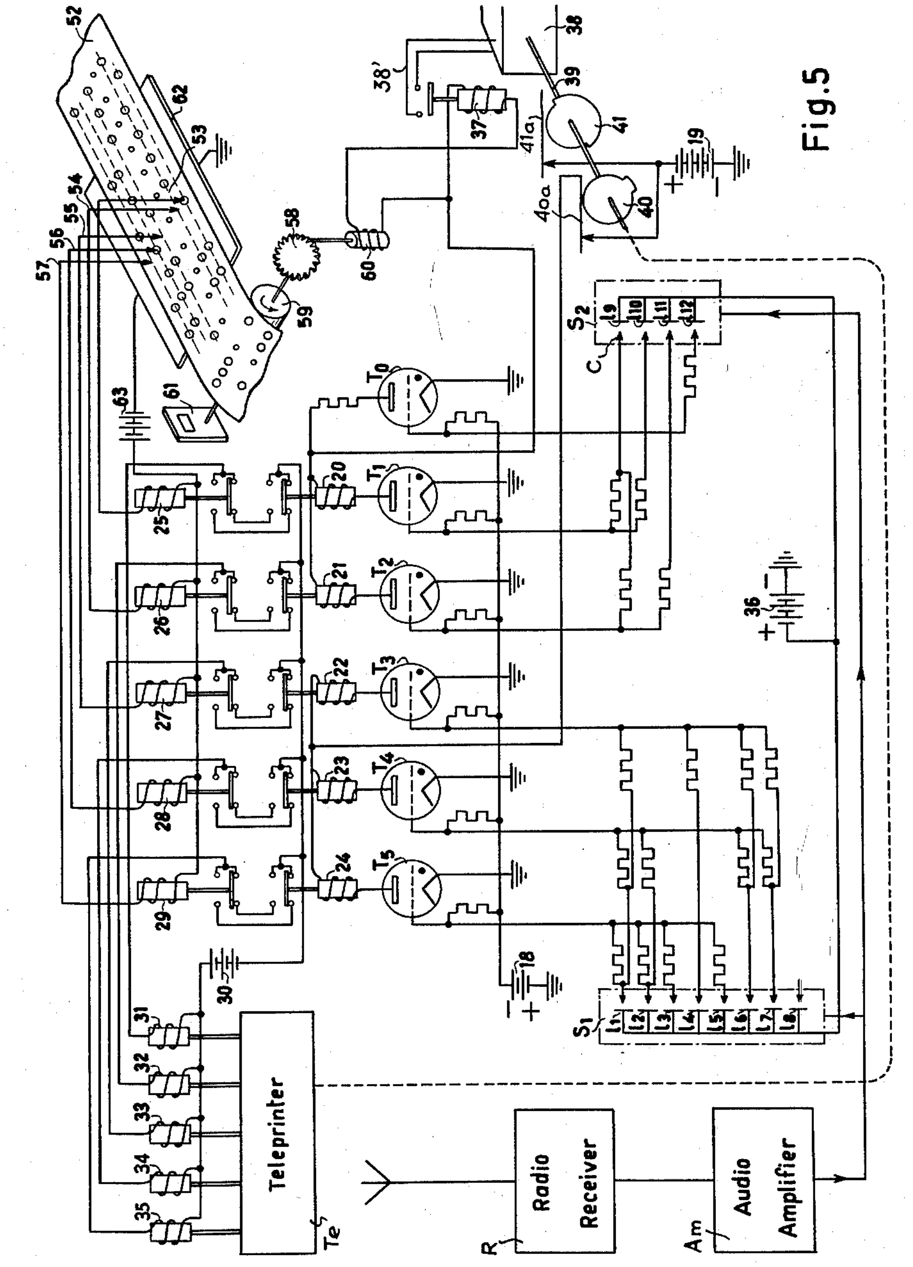
Fig. 5 is a schematic diagram illustrative of the receiving station of the system according to the invention.

The selector $S_1$ comprises eight blades responsive to signals of group I corresponding to frequencies representative of the units 1 through 8 whereas the selector $S_2$ has four blades responsive to signals representative of the units or frequencies 9 through 12 of group II according to Fig. 2. The blades are shown schematically in the blocks $l_1$ to $l_8$ of device $S_1$ and blocks $l_9$ through $l_{12}$ of device $S_2$. Each blade of the devices $S_1$ and $S_2$ has an inherent resonant frequency so that when a signal corresponding to the resonant frequency is applied it will vibrate and make contact with a respective contact, as for example, C. The respective contacts of the vibratory elements are connected to grids of thyratrons $T_0$ through $T_5$. The grids of the thyratrons $T_0$ through $T_5$ are normally negatively biased by a source of voltage 18, to which they are connected at the negative terminal thereof. The anodes of thyratrons $T_1$ through $T_5$ are connected to operating coils of relays, 20 through 24 respectively, and have a positive voltage applied thereto from a positive terminal of a power source 19 when make-break switch elements **40*a* and 41*a* are in a closed position as shown in Fig. 5. Relays 20 through 24** have movable contacts shown in position assumed to be the position thereof when the relays are deenergized.

Five solenoids 31 through 35, each corresponding to a unit in the five unit code, are provided for actuating the mechanism of a teleprinter $T_e$ as later herein described and have operating coils connected to a source of current 30 and to fixed contacts of relays 25 to 29 respectively. The relays 25 through 29, are shown with their movable contacts in a rest position corresponding to deenergized conditions of the relays which function to carry out an inversion of signals or decoding function as later herein set forth.

Devices $S_1$ and $S_2$ are connected to a positive terminal of a source of energy 36 so that a positive voltage is applied to the corresponding contacts of the blade elements $l_1$ through $l_8$ and $l_9$ through $l_{12}$ so that when a signal is applied to a respective blade and its associated contact is closed a positive voltage is applied to the grid of the thyratron to which the associated contact is connected to render the thyratron conductive.

It will be understood that the contacts associated with the respective blades are connected to thyratrons $T_0$ through $T_5$ in such a manner that the twelve unit code or arrangement of the signals is converted to the equivalent five unit code. As for example, if the letter A is transmitted it can be seen, according to Fig. 3, that signals are applied successively to blades $l_8$ and $l_9$ which will presumably energize solenoids which correspond to the units 1 and 2 of the five unit code whereas solenoids corresponding to the units 3, 4 and 5 would remain in an "off" condition at rest. According to the schematic diagram of Fig. 5 it can be seen that blade $l_8$ is not connected to a thyratron and a signal applied thereto is ineffective. When blade $l_9$ has a signal applied thereto a positive voltage is applied through contact C to the grids of thyratrons $T_1$ and $T_2$ rendering these tubes conductive. The operating coils of relays 20 and 21 are energized and the respective movable contacts of these relays are moved to a raised position from the position shown in Fig. 5 so that a circuit is established from source 30 through the contacts of relays 25 and 26 in the rest position so that solenoids 31 and 32 would be actuated to actuate the necessary mechanism in the teleprinter to print the characters corresponding to the signals applied.

It will be understood therefore that the thyratrons $T_1$ through $T_5$ and electromagnets 31 through 35 correspond respectively to the markings and spacings of units 1 through 5 of the five unit code and are divided into two groups. The first group comprises the thyratrons $T_3$, $T_4$ and $T_5$ which are rendered conductive if a transmission of a signal having frequency belonging to group I of Fig. 2 is received. The second group comprises the thyratrons $T_1$ and $T_2$ and have their anodes connected to the operating coils of relays 20 and 21 respectively. The common anode circuit of thyratrons $T_0$, $T_1$, $T_2$ passes through the operating coil of a relay 37 as shown.

Whenever relay 37 is energized due to the fact that a thyratron is rendered conductive it causes a circuit 38' to be closed at a printing device 38 thereby to rotate a shaft 39, operatively connected to the teleprinter $P_e$, and carry out the printing of a letter and simultaneously rotate a pair of cams 40 and 41 fixed to the shaft thereby to open one of the switch blades **40*a* and 41*a*** respectively to temporarily break the anodic circuit of the thyratrons in order to place them in a condition of non-conductance making it possible for them to receive the next successive signals representative of a next successive character, sign or number being transmitted.

Figure 3:
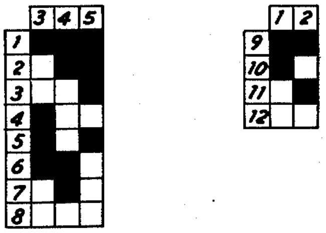
Fig. 3 is a diagram illustrative of the correspondence between "markings" and "spacings" of the code diagrams of Figs. 1 and 2.

Since certain characters or letters correspond to an "off" condition in which the thyratrons $T_1$ and $T_2$ are non-conductive, as for example, it can be seen in Fig. 3 that a signal corresponding to the frequency 12 or frequency code unit 12 does not render any of the thyratrons conductive and it is necessary, however, to insure the excitation of relay 37, which effectively causes printing device 38 to carry out its operation, a thyratron $T_0$ is accordingly provided which is rendered conductive if neither of the thyratrons $T_1$ or $T_2$, or any of the other thyratrons, is in a conductive state. By tracing the circuitry between blade $l_{12}$ and the grid of thyratron $T_0$ it can be seen that the application of a signal corresponding to the resonant frequency of the blade $l_{12}$ causes the thyratron $T_0$ to be rendered conductive in the manner similar to the other tubes so that relay 37 has its operating coil effectively energized and the functions it controls are carried out in the manner heretofore described each time a transmission of a signal representative of a character takes place.

The elements and operations described heretofore are substantially those of teleprinter systems which are known and which operate according to a twelve frequency or twelve unit code with the code being converted or transformed upon reception of the signals to correspond to a five unit code employed in other known systems. The apparatus, according to the invention, is a ciphering and deciphering apparatus for teleprinter systems of the type heretofore described.

The ciphering or encoding function of the apparatus is carried out at the transmission end of the system and is carried out under control of a perforated strip or tape 42. The tape is provided with perforations arranged in five longitudinal rows or tracks shown by dotted lines with each track representative of a unit in the five unit international code system. The perforations in each row or track are arbitrarily arranged in accordance with an aleatory law, according to chance, making it possible to maintain the secrecy of the cipher employed in the encoding function in transmission of a message.

The tape 42 is advanced longitudinally a step, corresponding to the distance between two successive transverse rows of perforations, after each transmission of a letter or character. To this end, ratcheting means comprising a drum 43 having peripheral teeth, not shown, engaging suitable perforations on tape 42 is rotatably driven by a ratchet wheel 44 operatively connected to electromagnet or solenoid 45 which is electrically energized from the keyboard and associated equipment K upon transmission of a character or the signals representative of a given character. A continuous record of the number of characters transmitted is kept by a counter 65 operatively connected to drum 59.

As the tape 42 is advanced longitudinally step-by-step it overlies an electrically conductive plate 46 which is grounded as shown. The tape is sensed by sensing elements or contacts schematically shown at 47, 48, 49, 50 and 51 arranged to sense the perforations of a respective track. The sensing contacts 47 through 51 are connected to respective operating coils of relays 16, 17, 15, 14 and 13 respectively. These contacts effectively control the excitation of their respective relay operating coils from a power source 64.

Figure 4:
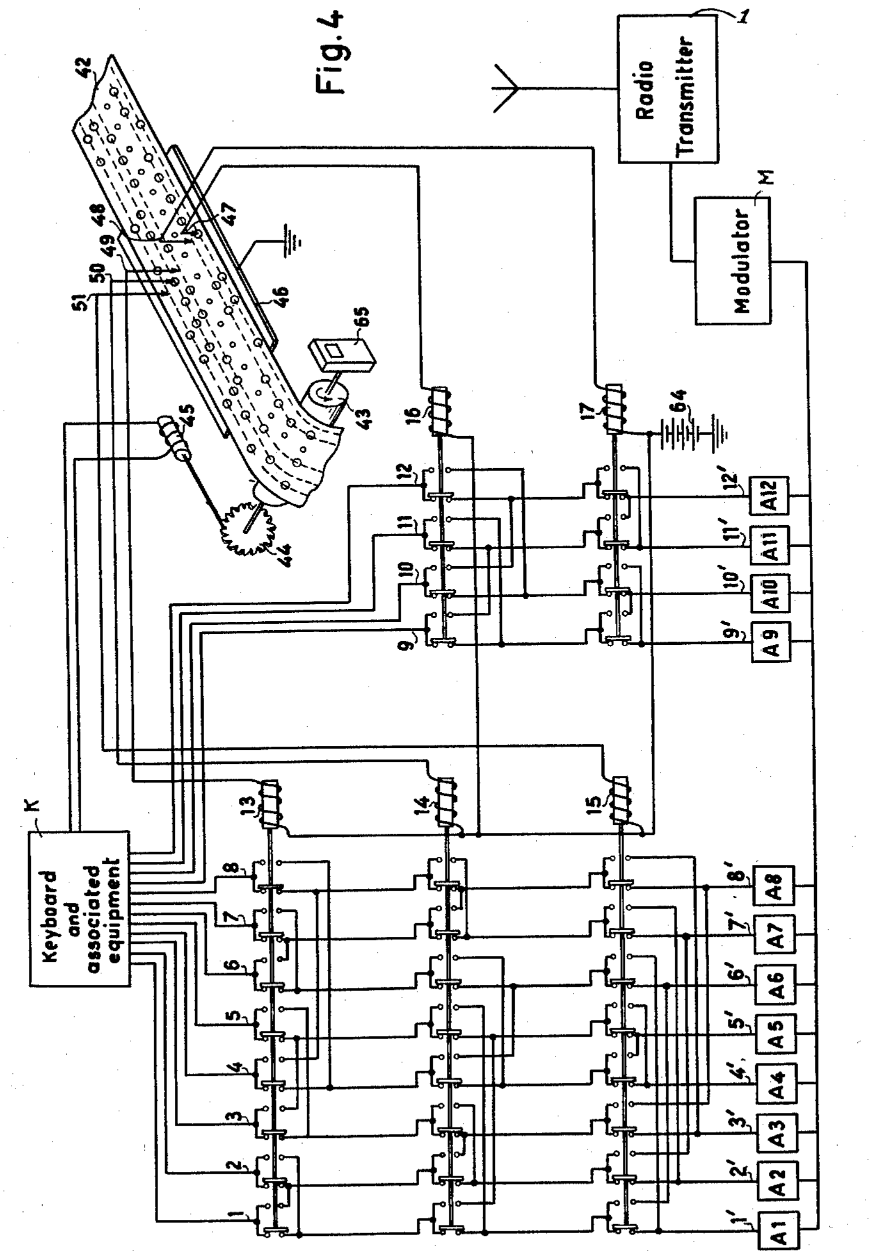
Fig. 4 is a schematic diagram illustrative of the transmission end or station of the system according to the invention.

For example, in the position shown in Fig. 4 contacts 47 and 49 are in position with the corresponding tracks having perforations underlying them so that an electrical circuit is established through plate 46 to ground whereby relays 14 and 16 are energized moving the movable contacts thereof toward the right so that the lines or channels designated as 9, 10, 11 and 12 are effectively disconnected from lines 9' through 12' so that connections take place with lines 11', 12', 9' and 10' so that signals corresponding to the ninth and tenth units or frequencies are interchanged respectively signals corresponding to units 11 and 12 or the eleventh and twelfth frequencies. By reference to Fig. 3 it can be seen that the change with respect to the five unit code corresponds to an inversion of the unit 1 of the five unit code just as if the dark markings were replaced by white squares or spacings and vice versa.

In a comparable manner, when relay 14 is energized line 1 is effectively connected to line 5', line 2 with line 3', line 3 with line 2', line 5 with line 1', line 6 with line 4', line 7 with line 8', and line 8 with line 7', so that the transfer of connections is equivalent to an interchange in signals wherein the signals corresponding to frequencies 1, 2, 4 and 7 are interchanged respectively with frequencies 5, 3, 6 and 8.

In accordance with the diagram in Fig. 3 the interchange of connections is the same as if the markings in the vertical column associated with unit 4 of the five unit code were subjected to an inversion whereby the dark squares or dark markings are replaced by white spacings and vice versa. It will be understood therefore that the energization of relays 13 through 17 therefore corresponds to an inversion of the corresponding unit of the five unit code. The net result is that since the perforations of the tape occur in an arbitrary manner or according to chance the inversions will be produced in an arbitrary manner which makes the message transmitted incapable of being deciphered or decoded if intercepted.

At the receiving end of the system (Fig. 5) a perforated tape or strip 52 identical with tape 42 is advanced longitudinally step-by-step in phase with tape 42 as later herein set forth. Sensing contacts 54 through 57, connected in series with the operating coils of relays 25 through 29 respectively, are disposed to sense respective tracks of perforations on tape 52 and establish a circuit, to energize their respective operating coils in dependence upon sensing of a perforation, from a current source 63. The operating coils of relays 25 through 29 are connected to source 63 through a grounded electrically conductive plate 62 over which the tape 52 moves during its longitudinal travel.

The tape 52 is advanced step-by-step in a manner similar to tape 42 by ratcheting a ratchet wheel 58 operatively connected to drum 59 which has peripheral teeth engaging special perforations on tape 52. The wheel 58 is rotated step-by-step by energization of a relay 60 which is connected in parallel to the operating coil of relay 37. Each time relay 37 is energized upon transmission of a signal corresponding to a character as heretofore set forth the relay 60 is energized and it effectively rotates ratchet wheel 58 the equivalent of one tooth which is the equivalent of the spacing or distance between successive transverse rows of perforations on tape 52 so that tapes 42 and 52 are advanced in phase. A counter 61 records the steps as tape 52 is advanced, it being understood that the count recorded in counter 61 must correspond with the count in counter 65 when the two systems are in phase.

In the illustration shown in Fig. 5 tape 52 is assumed to be in a position corresponding to position shown in Fig. 4 with respect to tape 42 so that corresponding perforations are being sensed. Accordingly, contacts 53 and 56 are shown making electrical contact with plate 62 and therefore establishing a circuit for causing current to flow through the operating coils of relays 25 and 28.

The operation of relay 25, for example, causes its movable contacts to be lifited so that a circuit is established from power source 30 to the operating coil of solenoid 31 if thyratron $T_1$ is in a non-conductive condition. If the thyratron $T_1$ is in a conductive condition or state it operates to prevent excitation of the operating coil of relay 31. The same holds true for the operation of relays 26 through 29, thyratrons $T_2$ through $T_5$ and related solenoids 32 through 35. It will be understood therefore that relays 25 through 29 are effectively connected to carry out an inversion of a corresponding unit of the five unit code when a signal corresponding thereto is received and since these inversions are made in synchronism with those produced at the transmitting end the inversion taking place at the receiving end results in the transmitted characters being received directly as if the text of the message transmitted had not been ciphered. The message is therefore received in clear text.

The system may be provided with means to check the clear transmission locally by installing a device similar to that shown in Fig. 5 controlled by the perforated tape at the transmitting end so that the transmitting end can continuously check its transmission so that the message is transmitted correctly.

As an alternative to the embodiment heretofore described solenoids 31 through 35 can be provided each with two separate opposing windings, one of the windings would be connected in series with the anode of a respective thyratron and the other winding being energized through a sensing contact thereby eliminating the use of relays 20 through 29.

While preferred embodiments of the invention have been shown in this regard it will be understood that many modifications and changes can be made within the scope of the invention.

What I claim and desire to secure by Letters Patent is:

1. In a teleprinter arrangement in which each character of a message is represented by two successive signals having different frequencies according to a twelve-frequency code, and having means for the selection of received signals comprising five teleprinter selector electromagnets each corresponding to a respective unit of the standard international code and the twelve-frequency code being established according to a table in which the frequencies one to eight correspond to combinations of the units three to five and the frequencies nine to twelve correspond to the units one and two respectively of the standard international code, the combination of encoding means comprising a first five-track perforated tape having perforations arranged according to an arbitrary arrangement, each track of said tape corresponding to a respective unit of the standard international code, means for advancing the tape in response to transmission of each character, signal generating means for generating separate signals, first inverting means operatively connected to said signal generating means, means for sensing the tape operatively connected to said inverting means operatively connected to the signal generating means to cause permutations in the frequencies of the signals in response to the perforations of each track of the tape, said permutations corresponding to an inverse state of the units which correspond, according to the table, to the perforated track sensed, decoding means comprising a second perforated tape identical to the first tape, means for advancing said second tape in phase with the first tape, each track of said second tape corresponding to one of the five selector magnets of the teleprinter, second inverting means operatively connected to said five selector electromagnets, means for sensing said second tape, operatively connected to said second inverting means to cause the inversion of the signals according to the perforations of the corresponding track and the state of energization of the respective magnet thereby to reconstruct the text arrangement according to an uncoded arrangement in the standard international code.

2. The combination with a teleprinter arrangement according to claim 1, in which said signal generating means comprise at least twelve signal generator means in which said first inverting means comprise a first group of three relays corresponding to the units three, four and five respectively of the standard international code, each of said three relays having eight inverting contacts operatively connected to the respective signal generating means, a second group of two relays corresponding to the units one and two respectively of the standard international code, each of said two relays having four inverting contacts operatively connected to the four remaining signal generating means, connecting means between the five relays and the signal generating means to cause connected permutations between the signals in response to the operation of the respective relays and said permutations corresponding to the inverse state of the unit of the standard international code which corresponds to the relay operated.

3. The combination with a teleprinter arrangement according to claim 1, in which said second inverting means comprise five relays corresponding to the five units of the standard international code, each of said relays having inverting contacts operatively connected to the corresponding selector electromagnet of the teleprinter to cause in response to the energization of a respective relay the inversion of the state of energization of the selector electromagnet.

References Cited in the file of this patent

UNITED STATES PATENTS

| | | |
|---|---|---|
| 2,517,587 | Mohr | Aug. 8, 1950 |
| 2,706,215 | Van Duuren | Apr. 12, 1955 |
| 2,771,506 | Coquelet | Nov. 20, 1956 |
| 2,785,224 | Ehrat | Mar. 12, 1957 |
| 2,847,503 | Diamond | Aug. 12, 1958 |